Patented Apr. 28, 1931

1,802,667

UNITED STATES PATENT OFFICE

CHARLES A. NEWHALL, OF SEATTLE, WASHINGTON

HYDRAULIC CEMENT CONCRETE AND MORTAR

No Drawing.  Application filed February 1, 1926. Serial No. 85,395.

It has long been known that Portland cement concrete is not stable when subjected to the action of percolating water, especially when the water carries "alkali" salts, carbonic acid, organic matter or like impurities that may be present in natural waters. The disintegration of ordinary concrete is due to the removal, by the percolating waters, of the calcium hydroxide that is always formed during the setting and ageing of Portland cement concrete; the calcium hydroxide being removed directly in solution or in chemical combination with the impurities that may be present in the percolating water.

The purpose of my invention is to make possible the use of hydraulic cement concrete through preventing the removal of this calcium hydroxide. This is accomplished, first, through a reaction between the calcium hydroxide and the stabilizing substance I add to the concrete whereby a compound much less soluble than calcium hydroxide is formed just as rapidly as the calcium hydroxide is set free from the cement of the concrete; secondly, through the filling up of the voids of the concrete by the insoluble compound so formed whereby the water is sealed off from the body of the concrete and thus disintegration is prevented. The filling up of the voids of the concrete is accomplished in the following manner. In the setting and ageing of Portland cement or other hydraulic cement, some calcium hydroxide is formed. In accordance with my invention I add a material or mixture of materials which react with the calcium of the cement to form insoluble compounds thus preventing the formation of calcium hydroxide, or if calcium hydroxide is first formed it is immediately converted into an insoluble compound by reaction with the material added to the cement. The insoluble compound thus formed from the reaction of calcium hydroxide and the added material is bulkier than calcium hydroxide. It therefore fills up any voids which otherwise would be present in the cement as a result of the dissolving action of water on calcium hydroxide.

My composition consists preferably of the following ingredients, namely

Aluminum, two parts by weight.
Ferrosilicon, eight parts by weight.
Portland cement, ninety parts by weight.

Instead of ferrosilicon the silicon metal may be used as the higher the silicon content the more suitable for our purpose. Silicon, ferrosilicon, or combinations of these materials, or other suitable metals or substances which will react with calcium hydroxide to form insoluble compounds may be employed. The principal consideration in the selection of the materials to be added to the cement or concrete is that the reaction of such materials with calcium hydroxide must proceed so slowly that any gas which is liberated by the reaction will be liberated after the cement has set. If gas is liberated before the cement has set, a porous, honey-combed structure is formed which is exactly the opposite effect desired to be obtained by the practice of my invention.

In place of Portland cement, Portland cement "clinker" together with the usual amount of gypsum may be used. Limestone and clay, as commonly blended in Portland cement manufacture, may be sintered or melted with carbon or suitable reducing agent in such manner that the proper proportion of free silicon is formed and the resulting clinker ground into cement as usual.

In preparing my composition it is essential that the constituents be very finely pulverized and intimately mixed. I secure the best results by crushing Portland cement clinker, ferrosilicon, aluminum and gypsum to all pass about a 20 mesh screen, and then pulverizing the mixture in a pebble mill or tube mill until approximately 90% will pass a 200 mesh screen. The metal is practically inert unless most of it is pulverized far finer than the 200 mesh size but by the use of a pebble mill or tube mill sufficient of the metal is reduced to an extreme degree of fineness. The finer the metal the more positive and satisfactory the reaction. The exact reactions which take place when the above mentioned materials are added to Portland cement and water is not definitely known, and I know of no method for definitely determining these reactions. The added materials may react with the calcium of the various silicates and aluminates normally present in Portland cement, or they may react with the calcium hydroxide which is set free when Portland cement is hydrated. We do know, however, that a similar reaction takes place when the materials are mixed with water and calcium hydroxide. I therefore have assumed that the reaction in the case of Portland cement is substantially the same as the reaction with calcium hydroxide.

As to the compounds formed when Portland cement and metals react, we can conclude that these compounds are the calcium salts of the various silicates, aluminates, and ferrates that might be formed. Of the silicates alone there are four normal salts that may be considered. These are calcium metasilicate (wollastonite), calcium orthosilicate, calcium trisilicate, and calcium tetrasilicate. In addition to these silicates there are numerous indefinite hydrated and basic or acidic double salts that might possibly be formed. In a similar manner the various normal and indefinite compounds of aluminum and iron with calcium are or may be formed.

Apparently the calcium hydrate that is set free when Portland cement is hydrated is in a nascent or like unusually active form. This accounts for the unexpected reactions with silica or like compounds of silicon.

The reactions are believed to be represented by the following reactions:

$$Si + 2Ca(OH)_2 = 4H + Ca_2SiO_4$$
$$SiO_2 + 2Ca(OH)_2 = 2H_2O + Ca_2SiO_4$$

It is not claimed that these are the exact compounds formed as it probably is true that other compounds such as calcium orthosilicate and calcium trisilicate result from the reactions.

In using my composition to make hydraulic concrete or mortar the best results are obtained when the finely ground mixture is agitated in a concrete mixer along with the suitable aggregate and water exactly as in making ordinary Portland cement concrete. However, the finely ground metal or metals may be added directly to the concrete mixture in the mixer and then thoroughly agitated with the Portland cement, the aggregate and the water. The concrete is then placed in forms and cured as is the usual procedure.

The term "metallic silicon-containing material" as used in the claims is intended to include silicon and ferrosilicon.

I claim:—

1. A substantially insoluble composition of the character described comprising an intimate mixture in finely divided condition of approximately 90 parts by weight of Portland cement, 2 parts by weight of aluminum, and 8 parts by weight of ferrosilicon.

2. A composition of the character described comprising an intimate mixture of Portland cement, aluminum, and ferrosilicon in finely divided condition.

3. A substantially insoluble composition of the character described comprising a hydraulic cement of low free lime content having a finely divided composition comprising aluminum and metallic silicon-containing material intimately associated therewith.

4. A composition of the character described comprising a calcareous binder including combined or fixed calcium hydroxide and a finely divided composition comprising aluminum and metallic silicon-containing material associated therewith, said last named composition being adapted to react, after said binder has set, with the calcium hydroxide thereafter liberated during ageing to form a substantially insoluble compound of greater bulk than calcium hydroxide.

5. A composition of the character described comprising a hydraulic cement containing combined or fixed calcium hydroxide but containing substantially no free calcium hydroxide, and a composition comprising aluminum and a metallic silicon-containing material which is adapted to react slowly with the calcium hydroxide liberated during the ageing of the cement to form a composition which is less soluble than calcium hydroxide and of greater bulk.

6. A composition of the character described comprising an intimate mixture of Portland cement and ferrosilicon in finely divided condition.

7. A substantially insoluble composition of the character described comprising a hydraulic cement of low free lime content having a finely divided metallic silicon-containing material associated therewith.

CHAS. A. NEWHALL.